US012060980B1

(12) United States Patent
Garber

(10) Patent No.: US 12,060,980 B1
(45) Date of Patent: Aug. 13, 2024

(54) ROOF-MOUNTED LIGHT FIXTURE ATTACHMENT APPARATUS AND SYSTEM

(71) Applicant: EmeryAllen, LLC, Mt. Pleasant, SC (US)

(72) Inventor: Thomas Garber, Daniel Island, SC (US)

(73) Assignee: EmeryAllen, LLC, Mt. Pleasant, SC (US)

( * ) Notice: Subject to any disclaimer, the term of this patent is extended or adjusted under 35 U.S.C. 154(b) by 0 days.

(21) Appl. No.: 18/212,662

(22) Filed: Jun. 21, 2023

(51) Int. Cl.
*F21S 8/00* (2006.01)
*F21V 17/12* (2006.01)

(52) U.S. Cl.
CPC ................ *F21S 8/03* (2013.01); *F21V 17/12* (2013.01)

(58) Field of Classification Search
CPC ....... F21S 8/03; F21V 17/12; F21W 2121/004
See application file for complete search history.

(56) References Cited

U.S. PATENT DOCUMENTS

| | | | | |
|---|---|---|---|---|
| 5,544,031 | A * | 8/1996 | Blanton | F21S 4/10 362/396 |
| 6,012,827 | A * | 1/2000 | Caplan | F21V 21/0965 362/396 |
| 11,441,588 | B1 * | 9/2022 | Bradford | F16B 5/02 |
| 2009/0201685 | A1 * | 8/2009 | George | F21V 21/096 362/398 |
| 2017/0002567 | A1 * | 1/2017 | Shevlin | F24S 25/613 |
| 2017/0338767 | A1 * | 11/2017 | Shevlin | H02S 20/23 |
| 2019/0236919 | A1 * | 8/2019 | Mehdi | H04N 23/57 |
| 2019/0250485 | A1 * | 8/2019 | Richins | F16M 11/041 |

* cited by examiner

*Primary Examiner* — Elmito Breval
*Assistant Examiner* — Michael Chiang
(74) *Attorney, Agent, or Firm* — Gregory Finch; Finch Paolino, LLC

(57) ABSTRACT

An apparatus and system for mounting an exterior illumination fixture to the roof of a building or other structure. Certain aspects of the present disclosure provide for a roof-mounted attachment apparatus comprising a metal plate comprising one or more apertures (i.e., nail holes) and at least one fastener extending through the metal plate. In certain embodiments, the at least one fastener is coupled to the metal plate such that the lower surface of the metal plate sits flush when installed on a surface of a roof. In accordance with certain aspects of the present disclosure, an exterior illumination fixture is configured to be coupled to the upper surface of the metal plate via the at least one fastener to enable one or more exterior lighting applications.

20 Claims, 8 Drawing Sheets

ROOF-MOUNTED LIGHT FIXTURE ATTACHMENT APPARATUS AND SYSTEM

FIELD

The present disclosure relates to the field of exterior illumination products; in particular, a roof-mounted apparatus for mounting an exterior lighting fixture.

BACKGROUND

Outdoor lights are used in landscapes and other exterior applications to illuminate different elements of a landscape, building or other structure, such as architectural elements including windows, paths and stairs. Certain architectural lighting designs and applications include lighting of dormer windows and other architectural elements that require an exterior lighting fixture to be mounted on the roof of a building. Common approaches to mounting exterior lighting fixtures on a roof typically include mounting the lighting fixture to an eave or soffit of the roof. Certain architectural lighting designs and applications would benefit from mounting an exterior lighting fixture directly to the surface of the roof. However, penetrating the roofing surface with screws or nails may compromise the integrity of the roof and make it prone to leaks.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

Certain aspects of the present disclosure provide for a roof-mounted apparatus and system for mounting an exterior lighting fixture comprising a metal plate comprising an upper surface and a lower surface, and at least one fastener extending through the metal plate from the lower surface to the upper surface. In certain embodiments, the metal plate comprises at least one aperture configured to receive a roofing nail therethrough. The at least one fastener may be coupled to the metal plate such that the lower surface of the metal plate sits flush when interfaced with a planar surface. The at least one fastener may be configured to be selectively coupled to an exterior illumination fixture to mount the exterior illumination fixture on the upper surface of the metal plate.

In accordance with certain embodiments, the metal plate comprises a thickness in the range of 0.5 millimeters to 2 millimeters. In certain embodiments, the metal plate comprises a width in the range of 3 inches to 6 inches. In certain embodiments, the metal plate comprises a length in the range of 6 inches to 10 inches. In certain embodiments, the at least one aperture is spaced apart from the at least one fastener in the range of 3 inches to 7 inches. In certain embodiments, the at least one fastener comprises a threaded bolt. In certain embodiments, the roof-mounted apparatus and system further comprises a nut configured to mateably interface with the threaded bolt. In certain embodiments, the nut comprises a thumb nut. In certain embodiments, the roof-mounted apparatus and system further comprises a bracket configured to be selectively coupled to the at least one fastener. The bracket may be configured to be selectively coupled to the exterior illumination fixture to mount the exterior illumination fixture to the upper surface of the metal plate.

Certain aspects of the present disclosure provide for a roof-mounted apparatus and system for mounting an exterior lighting fixture comprising a metal plate comprising an upper surface and a lower surface, and a first fastener and a second fastener extending through the metal plate from the lower surface to the upper surface. The metal plate may comprise at least one aperture configured to receive a roofing nail therethrough. In certain embodiments, the first fastener and the second fastener are coupled to the metal plate such that the lower surface of the metal plate sits flush when interfaced with a planar surface. In certain embodiments, the first fastener and the second fastener are positioned laterally adjacent to each other on the upper surface of the metal plate. In certain embodiments, the first fastener and the second fastener are configured to be selectively coupled to an exterior illumination fixture to mount the exterior illumination fixture on the upper surface of the metal plate.

In certain embodiments, the first fastener and the second fastener are spaced apart in the range of 1 inch to 3 inches. In certain embodiments, the at least one aperture is spaced apart from the first fastener and the second fastener in the range of 3 inches to 7 inches. In certain embodiments, the first fastener and the second fastener each comprise a threaded bolt.

The foregoing has outlined rather broadly the more pertinent and important features of the present invention so that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent structures do not depart from the spirit and scope of the invention as set forth in the appended claims.

BRIEF DESCRIPTION OF DRAWINGS

The skilled artisan will understand that the figures, described herein, are for illustration purposes only. It is to be understood that in some instances various aspects of the described implementations may be shown exaggerated or enlarged to facilitate an understanding of the described implementations. In the drawings, like reference characters generally refer to like features, functionally similar and/or structurally similar elements throughout the various drawings. The drawings are not necessarily to scale, emphasis instead being placed upon illustrating the principles of the teachings. The drawings are not intended to limit the scope of the present teachings in any way. The apparatus and system may be better understood from the following illustrative description with reference to the following drawings in which.

DETAILED DESCRIPTION

Figure 1A:
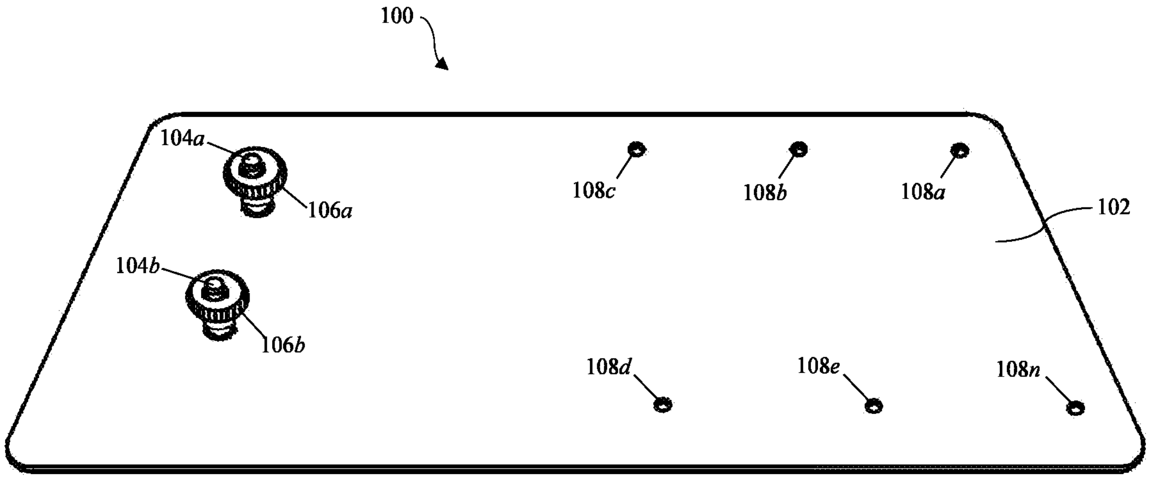
FIG. 1A is a perspective view of a roof-mounted light fixture attachment apparatus, in accordance with certain aspects of the present disclosure.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout. All definitions, as defined and used herein, should be understood to control over dictionary definitions, definitions in documents incorporated by reference, and/or ordinary meanings of the defined terms.

Following below are more detailed descriptions of various concepts related to, and embodiments of, inventive methods, devices and systems configured to provide for an apparatus and system for mounting an exterior illumination fixture to the roof of a building or other structure. Certain aspects of the present disclosure provide for a roof-mounted attachment apparatus comprising a metal plate comprising one or more apertures (i.e., nail holes) and at least one fastener extending through the metal plate. In certain embodiments, the at least one fastener is coupled to the metal plate such that the lower surface of the metal plate sits flush when installed on a surface of a roof. In accordance with certain aspects of the present disclosure, an exterior illumination fixture is configured to be coupled to the upper surface of the metal plate via the at least one fastener to enable one or more exterior lighting applications.

It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes. The present disclosure should in no way be limited to the exemplary implementation and techniques illustrated in the drawings and described below.

Where a range of values is provided, it is understood that each intervening value, to the tenth of the unit of the lower limit unless the context clearly dictates otherwise, between the upper and lower limit of that range and any other stated or intervening value in that stated range is encompassed by the invention. The upper and lower limits of these smaller ranges may independently be included in the smaller ranges, and are also encompassed by the invention, subject to any specifically excluded limit in a stated range. Where a stated range includes one or both of the endpoint limits, ranges excluding either or both of those included endpoints are also included in the scope of the invention.

As used herein, "exemplary" means serving as an example or illustration and does not necessarily denote ideal or best.

As used herein, the term "includes" means includes but is not limited to, the term "including" means including but not limited to. The term "based on" means based at least in part on.

As used herein, the term "interface" refers to any shared boundary across which two or more separate components of a computer system may exchange information. The exchange can be between software, computer hardware, peripheral devices, humans, and combinations thereof. The term "interface" may be further defined as any shared boundary or connection between two dissimilar objects, devices or systems through which information or power is passed and/or a mechanical, functional and/or operational relationship is established and/or accomplished. Such shared boundary or connection may be physical, electrical, logical and/or combinations thereof.

An exemplary system, method, and apparatus according to the principles herein may include an attachment apparatus configured to be installed on a surface of a roof and configured to mount an exterior lighting fixture thereto. In certain embodiments, the surface of the roof comprises an asphalt shingle roof.

In accordance with certain aspects of the present disclosure, a roof-mounted attachment apparatus may comprise a metal plate comprising an upper surface and a lower surface, and one or more apertures configured to receive one or more roofing nails therethrough. The roof-mounted attachment apparatus may further comprise at least one fastener extending through the metal plate from the lower surface to the upper surface. The at least one fastener may be coupled to the metal plate such that the lower surface of the metal plate sits flush when installed on a surface of a roof. In accordance with certain aspects of the present disclosure, an exterior illumination fixture is configured to be coupled to the upper surface of the metal plate via the at least one fastener.

In accordance with an exemplary use case provided by embodiments of the present disclosure, a user of a roof-mounted attachment system may install a roof-mounted attachment apparatus onto a surface of an asphalt shingle roof. The roof-mounted attachment apparatus may comprise a metal plate comprising an upper and a lower surface. The metal plate may have one or more holes disposed at a first end of the metal plate and one or more fasteners (e.g., screws or bolts) extending vertically from a second end of the metal plate (i.e., opposite the first end). A user of the roof-mounted attachment system may prepare for installation of the roof-mounted attachment apparatus by lifting up a shingle (or course of shingles) on the roofing surface. The metal plate may be positioned in the desired position with the smooth, bottom surface facing down and the one or more holes being positioned in an area below the lifted shingle (or shingles). The apparatus may then be installed to the roofing surface by nailing one or more roofing nails through the one or more holes and into the roof. The lifted shingle is then returned to its original position (i.e., is laid flat), thereby covering the portion of the metal plate comprising the one or more holes and the one or more roofing nail. The portion of the metal plate comprising the one or more fasteners (e.g., screws or bolts) extends beyond the end of the shingle such that the one or more fasteners are exposed. A user of the roof-mounted attachment system may then mount an exterior lighting fixture to the roof-mounted attachment apparatus via the one or more fasteners. In certain embodiments, the roof-mounted attachment system may comprise one or more brackets or adapters configured to facilitate a selective attachment interface between the exterior lighting fixture and the one or more fasteners.

Certain benefits and advantages of the present disclosure include an exterior light fixture mounting apparatus and system that is configured to be installed beneath an asphalt shingle of a roofing surface to provide a mounting surface for an exterior light fixture on the roofing surface, without impacting the integrity of the roofing surface.

Figure 1B:
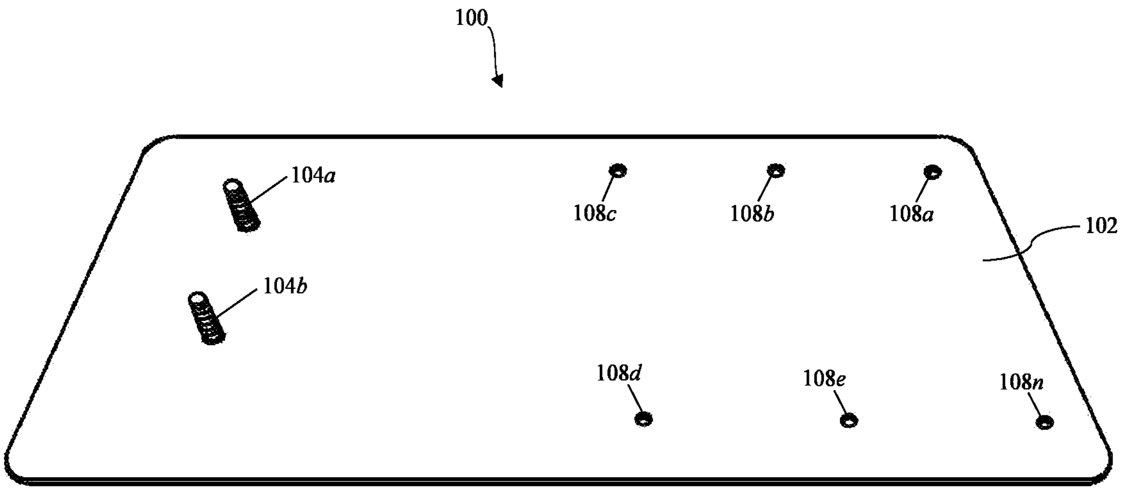
FIG. 1B is a perspective view of a roof-mounted light fixture attachment apparatus, in accordance with certain aspects of the present disclosure.
Figure 1C:
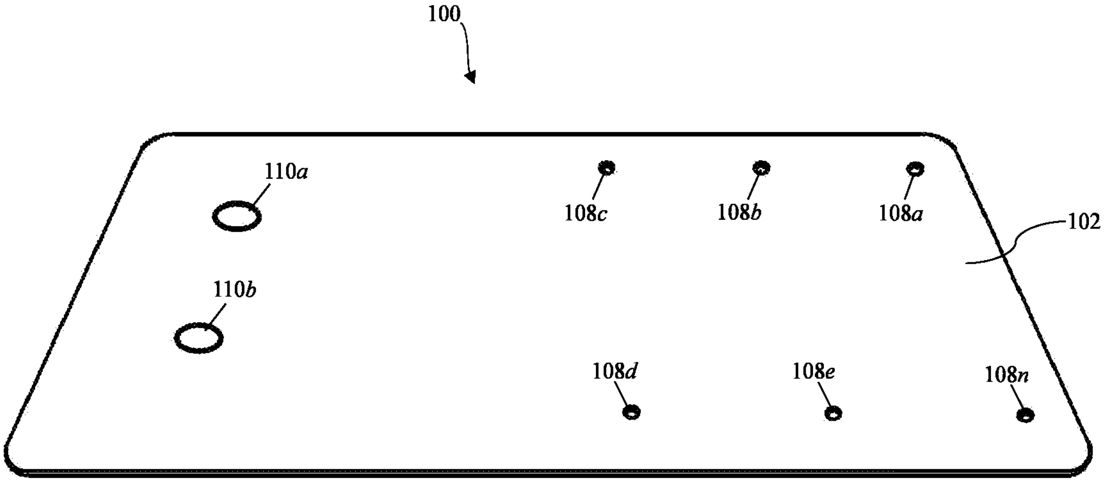
FIG. 1C is a rear perspective view of a roof-mounted light fixture attachment apparatus, in accordance with certain aspects of the present disclosure.

Turning now descriptively to the drawings, in which similar reference characters denote similar elements throughout the several views, FIGS. 1A-1C depict perspective views of a roof-mounted light fixture attachment apparatus 100. In accordance with certain aspects of the present disclosure, apparatus 100 comprises a metal plate 102, a first fastener 104*a*, a second fastener 104*b*, a first nut 106*a*, a second nut 106*b*, and a plurality of apertures 108*a-n* on metal plate 102. In accordance with certain embodiments, metal plate 102 may be made of stainless steel or another type of galvanized or coated metal configured to prevent corrosion from long-term outdoor exposure. In certain embodiments, metal plate 102 comprises a thickness in the range of about 0.5 millimeters to about 2 millimeters. In certain embodiments, metal plate 102 comprises dimensions in the range of about three to 3 to 6 inches in width and 6 to 10 inches in length. Apertures 108*a-n* may be disposed adjacent to a perimeter of metal plate 102 and may be equally spaced apart. In certain embodiments, apertures 108*a-n* may be spaced approximately 0.5 inches to 1 inch from the perimeter of metal plate 102. Apertures 108*a-c* may be disposed on a first side of metal plate 102 and apertures 108*d-n* may be disposed on an opposite side of metal plate 102 (e.g., as shown in FIGS. 1A-1C). Apertures 108*a-n* may be disposed on a first half of the surface of metal plate 102 (i.e., along approximately half the length of metal plate 102).

In certain embodiments, first fastener 104*a* and second fastener 104*b* are disposed at a first end of metal plate 102 (i.e., at an opposite end to apertures 108*a,n*). First fastener 104*a* and second fastener 104*b* may be spaced apart from apertures 108*a,n* along the length of metal plate 102. In certain embodiments, first fastener 104*a* and second fastener 104*b* are spaced in the range of about 3 inches to about 7 inches apart from apertures 108*a,n* relative to the length of metal plate 102. In certain embodiments, first fastener 104*a* and second fastener 104*b* comprise threaded bolts/machine screws comprising a male thread, and nuts 106*a-b* comprise a corresponding female thread. In certain embodiments, first nut 106*a* and second nut 106*b* comprise thumb nuts to enable tightening/loosening by hand (numerous other types of nuts and attachment means are anticipated and readily substitutable).

In accordance with certain aspects of the present disclosure, metal plate 102 comprises a top surface (as shown in FIGS. 1A-B) and a bottom surface (as shown in FIG. 1C). As shown in FIG. 1C, a head 110*a* of first fastener 104*a* (not shown) and a head 110*b* of second fastener 104*b* (not shown) are flat and slightly recessed on the bottom surface of metal plate 102, such that the bottom surface of metal plate 102 sits flush when interfaced with a planar surface (i.e., a tabletop).

Figure 2A:
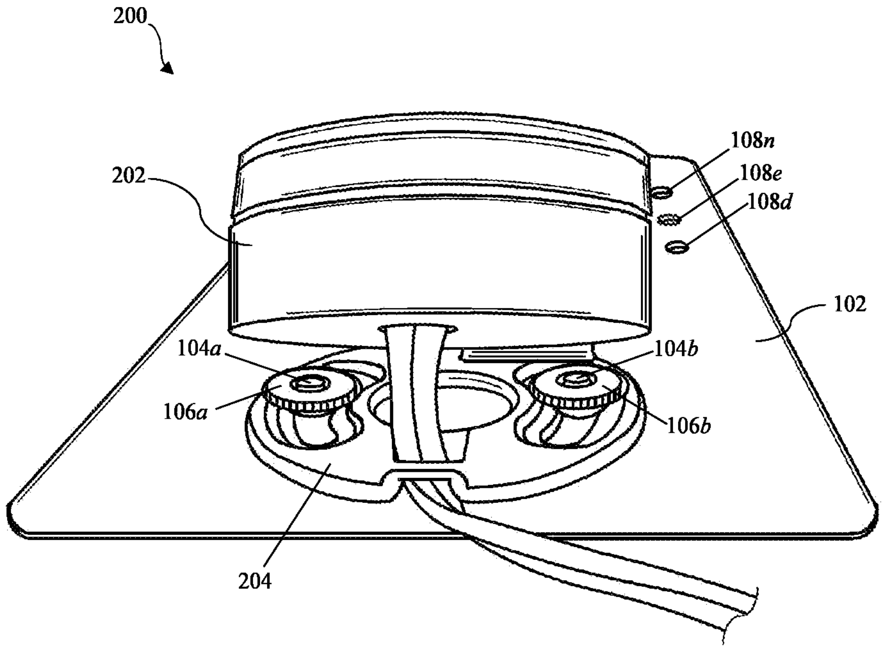
FIG. 2A is a perspective view of a roof-mounted light fixture system, in accordance with certain aspects of the present disclosure.
Figure 2B:
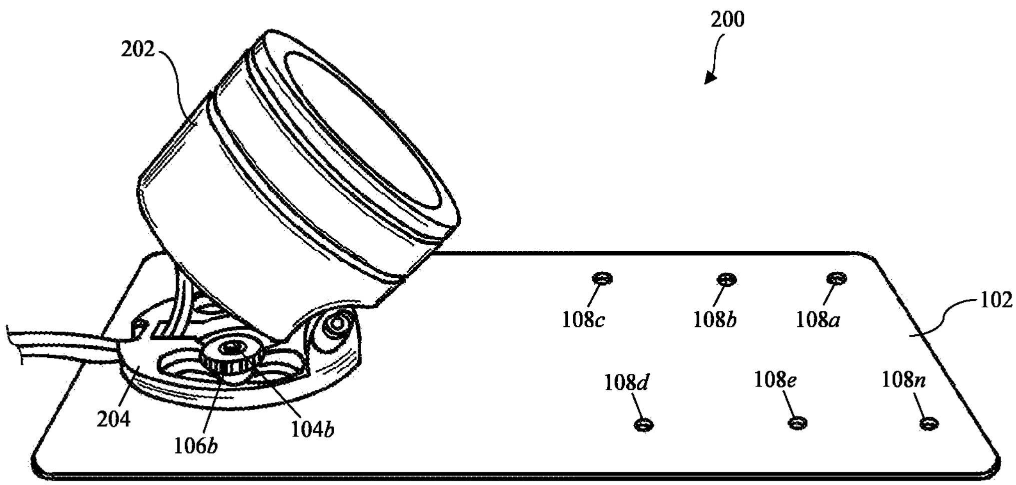
FIG. 2B is a perspective view of a roof-mounted light fixture system, in accordance with certain aspects of the present disclosure.

Referring now to FIGS. 2A-2B, perspective views of a roof-mounted light fixture system 200 are shown. In accordance with certain aspects of the present disclosure, system 200 comprises apparatus 100 and an exterior lighting fixture 202. As shown in FIGS. 2A-2B, fixture 202 is mounted to the upper surface of metal plate 102 via fasteners 104*a-b*. In certain embodiments, fasteners 104*a-b* may extend through a portion of a bracket 204. Nuts 106*a-b* may be interfaced with fasteners 104*a-b* and tightened to securely couple bracket 204 to the upper surface of metal plate 102. In certain embodiments, fixture 202 is pivotably coupled to bracket 204 to enable fixture 202 to be angled up/down according to the exterior lighting application.

Figure 3A:
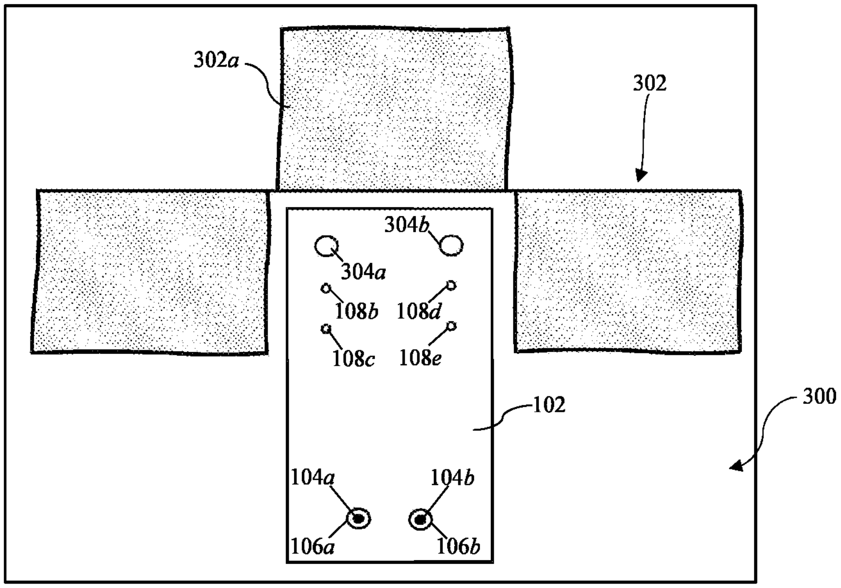
FIG. 3A is a functional diagram of an installation method for a roof-mounted light fixture apparatus, in accordance with certain aspects of the present disclosure.
Figure 3B:
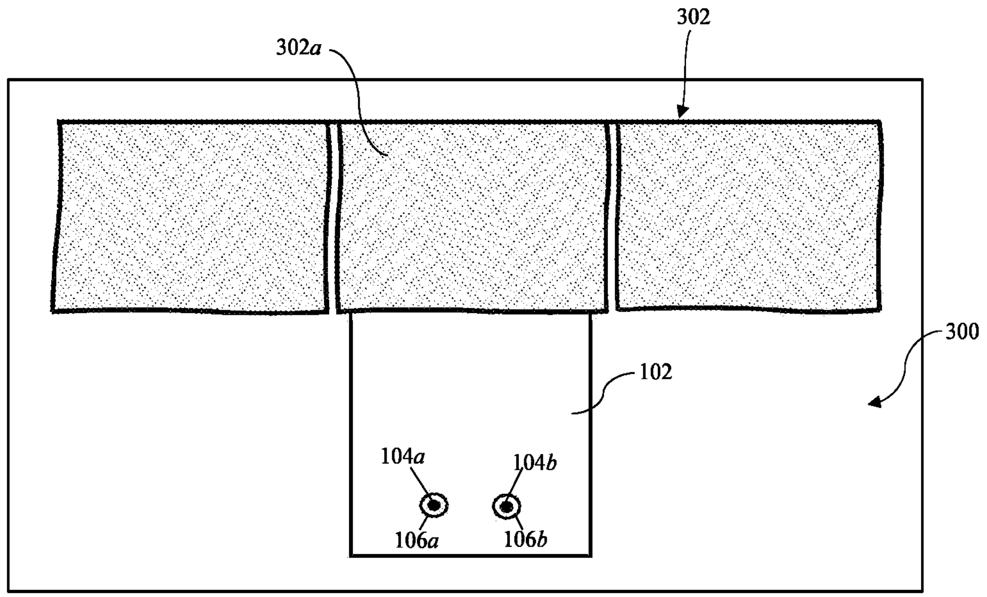
FIG. 3B is a functional diagram of an installation method for a roof-mounted light fixture apparatus, in accordance with certain aspects of the present disclosure.

Referring now to FIGS. 3A-3B, a functional diagram of an installation method for roof-mounted light fixture apparatus 100 is shown. In accordance with certain aspects of the present disclosure, apparatus 100 is operably installed on a roofing surface 300. In certain embodiments, roofing surface 300 comprises a plurality of asphalt roofing shingles 302. In alternative embodiments, roofing surface 300 may comprise a metal roof, a tiled roof, or other roofing surface. In accordance with certain use cases, apparatus 100 may be operably installed on surfaces other than a roof, such as trim, soffits, eaves, decking, and other architectural elements. In accordance with certain aspects of the present disclosure, as shown in FIG. 3A, a shingle 302*a* is lifted up to expose the surface underneath shingle 302*a*. Apparatus 100 is positioned in an area exposed by shingle 302*a* and is oriented such that apertures 108*a-n* are positioned in said area. One or more roofing nails 304*a,b* are positioned in one or more of apertures 108*a-n* (e.g., apertures 108*a,n*) and are nailed to roofing surface 300. As shown in FIG. 3B, upon securing apparatus 100 to roofing surface 300 via roofing nails 304*a,b* (as shown in FIG. 3A), shingle 302*a* is laid flat such that apertures 108*a-n* and roofing nails 304*a,b* are covered, thereby preventing any leaks in roofing surface 300 that may be caused by roofing nails 304*a,b*. In accordance with certain aspects of the present disclosure, a lower portion of apparatus 100 extends past the end of shingle 302*a* such that fasteners 104*a-b* and nuts 106*a-b* are exposed and operable when apparatus 100 is operably installed at roofing surface 300.

Figure 4:
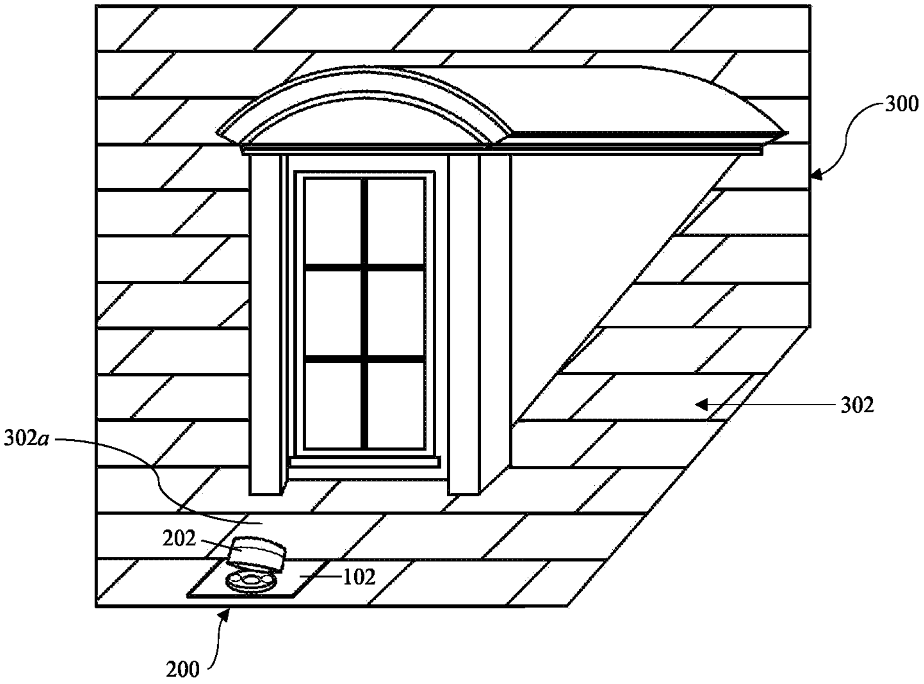
FIG. 4 is a perspective view of a roof-mounted light fixture system installed on a roof, in accordance with certain aspects of the present disclosure.

Referring now to FIG. 4, a perspective view of roof-mounted light fixture system 200 installed on a roof 300 is shown. In accordance with certain aspects of the present disclosure, apparatus 100 is installed on roofing surface 300 comprising a plurality of asphalt roofing shingles 302, as shown and described in FIGS. 3A-3B. Exterior lighting fixture 202 is selectively coupled to apparatus 100, as shown and described in FIGS. 2A-2B. In accordance with certain aspects of the present disclosure, as shown in FIG. 4, exterior lighting fixture 202 may be selectively positioned to direct a lighting output of exterior lighting fixture 202 at a desired angle in order to illuminate a desired architectural feature (e.g., a dormer window) in accordance with a specified lighting application.

The terminology used herein is for describing particular embodiments only and is not intended to be limiting of the embodiments. As used herein, the singular forms “a,” “an,”

and "the" are intended to include the plural forms as well, unless the context clearly indicates otherwise. It will be further understood that the terms "comprises," "comprising," "includes," and/or "including,", and variants thereof, when used herein, specify the presence of stated features, steps, operations, elements, and/or components, but do not preclude the presence or addition of one or more other features, steps, operations, elements, components, and/or groups thereof. As used herein, "exemplary" means serving as an example or illustration and does not necessarily denote ideal or best.

It will be understood that when an element is referred to as being "coupled," "connected," or "responsive" to another element, it can be directly coupled, connected, or responsive to the other element, or intervening elements may also be present. In contrast, when an element is referred to as being "directly coupled," "directly connected," or "directly responsive" to another element, there are no intervening elements present. As used herein, the term "and/or" includes any and all combinations of one or more of the associated listed items.

Spatially relative terms, such as "above," "below," "upper," "lower," "top, "bottom," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly. Well-known functions or constructions may not be described in detail for brevity and/or clarity.

It will be understood that, although the terms "first," "second," etc. may be used herein to describe various elements, these elements should not be limited by these terms. These terms are only used to distinguish one element from another. Thus, a first element could be termed a second element without departing from the teachings of the present embodiments. Unless otherwise defined, all terms (including technical and scientific terms) used herein have the same meaning as commonly understood by one of ordinary skill in the art to which these embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The present disclosure includes that contained in the appended claims as well as that of the foregoing description. Although this invention has been described in its exemplary forms with a certain degree of particularity, it is understood that the present disclosure of has been made only by way of example and numerous changes in the details of construction and combination and arrangement of parts may be employed without departing from the spirit and scope of the invention. Therefore, it will be apparent to those skilled in the art that various modifications and variations can be made to the disclosed embodiments without departing from the scope or spirit of the invention. In view of the foregoing, it is intended that the invention covers modifications and variations of this disclosure within the scope of the following claims and their equivalents.

What is claimed is:

1. An apparatus comprising:

a metal plate comprising an upper surface and a lower surface, the metal plate comprising at least one aperture configured to receive a roofing nail therethrough; and at least one fastener extending through the metal plate from the lower surface to the upper surface, wherein the at least one fastener is coupled to the metal plate such that the lower surface of the metal plate sits flush when interfaced with a planar surface, wherein the at least one fastener is configured to be selectively coupled to an exterior illumination fixture to mount the exterior illumination fixture on the upper surface of the metal plate, wherein the at least one aperture is disposed on an upper portion of the metal plate and the at least one fastener is disposed on a lower portion of the metal plate, wherein the lower portion of the metal plate is opposite from the upper portion of the metal plate, wherein the upper portion of the metal plate is configured to be installed beneath an asphalt shingle on a roofing surface, wherein the asphalt shingle is configured to be disposed on the upper portion of the metal plate when the metal plate is installed on the roofing surface such that the at least one aperture is covered by the asphalt shingle, wherein the lower portion of the metal plate is configured to extend beyond the asphalt shingle such that the at least one fastener is exposed when the asphalt shingle is disposed on the upper portion of the metal plate.

2. The apparatus of claim 1 wherein the metal plate comprises a thickness in the range of 0.5 millimeters to 2 millimeters.

3. The apparatus of claim 1 wherein the metal plate comprises a width in the range of 3 inches to 6 inches.

4. The apparatus of claim 1 wherein the metal plate comprises a length in the range of 6 inches to 10 inches.

5. The apparatus of claim 1 wherein the at least one aperture is spaced apart from the at least one fastener in the range of 3 inches to 7 inches.

6. The apparatus of claim 1 wherein the at least one fastener comprises a threaded bolt.

7. The apparatus of claim 6 further comprising a nut configured to mateably interface with the threaded bolt.

8. The apparatus of claim 7 wherein the nut comprises a thumb nut.

9. An apparatus comprising:

a metal plate comprising an upper surface and a lower surface, the metal plate comprising at least one aperture configured to receive a roofing nail therethrough; and a first fastener and a second fastener extending through the metal plate from the lower surface to the upper surface, wherein the first fastener and the second fastener are coupled to the metal plate such that the lower surface of the metal plate sits flush when interfaced with a planar surface, wherein the first fastener and the second fastener are positioned laterally adjacent to each other on the upper surface of the metal plate, wherein the first fastener and the second fastener are configured to be selectively coupled to an exterior illumination fixture to mount the exterior illumination fixture on the upper surface of the metal plate, wherein the at least one aperture is disposed on an upper portion of the metal plate and the first fastener and the second fastener are disposed on a lower portion of the metal plate, wherein the lower portion of the metal plate is opposite from the upper portion of the metal plate, wherein the upper portion of the metal plate is configured to be installed beneath an asphalt shingle on a roofing surface, wherein the asphalt shingle is configured to be disposed on the upper portion of the metal plate when the metal plate is installed on the roofing surface such that the at least one aperture is covered by the asphalt shingle, wherein the lower portion of the metal plate is configured to extend beyond the asphalt shingle such that the first fastener and the second fastener are exposed when the asphalt shingle is disposed on the upper portion of the metal plate.

10. The apparatus of claim 9 wherein the first fastener and the second fastener are spaced apart in the range of 1 inch to 3 inches.

11. The apparatus of claim 9 wherein the at least one aperture is spaced apart from the first fastener and the second fastener in the range of 3 inches to 7 inches.

12. The apparatus of claim 9 wherein the metal plate comprises a thickness in the range of 0.5 millimeters to 2 millimeters.

13. The apparatus of claim 9 wherein the metal plate comprises a width in the range of 3 inches to 6 inches.

14. The apparatus of claim 9 wherein the metal plate comprises a length in the range of 6 inches to 10 inches.

15. The apparatus of claim 9 wherein the first fastener and the second fastener each comprise a threaded bolt.

16. A system comprising:

a metal plate comprising an upper surface and a lower surface, the metal plate comprising at least one aperture configured to receive a roofing nail therethrough;

at least one fastener extending through the metal plate from the lower surface to the upper surface, wherein the at least one fastener is coupled to the metal plate such that the lower surface of the metal plate sits flush when interfaced with a planar surface, wherein the at least one fastener is configured to be selectively coupled to an exterior illumination fixture to mount the exterior illumination fixture to the upper surface of the metal plate, wherein the at least one aperture is disposed on an upper portion of the metal plate and the at least one fastener is disposed on a lower portion of the metal plate, wherein the lower portion of the metal plate is opposite from the upper portion of the metal plate, wherein the upper portion of the metal plate is configured to be installed beneath an asphalt shingle on a roofing surface, wherein the asphalt shingle is configured to be disposed on the upper portion of the metal plate when the metal plate is installed on the roofing surface such that the at least one aperture is covered by the asphalt shingle, wherein the lower portion of the metal plate is configured to extend beyond the asphalt shingle such that the at least one fastener is exposed when the asphalt shingle is disposed on the upper portion of the metal plate; and a bracket configured to be selectively coupled to the at least one fastener.

17. The system of claim 16 wherein the bracket is configured to be selectively coupled to the exterior illumination fixture to mount the exterior illumination fixture to the upper surface of the metal plate.

18. The system of claim 16 wherein the metal plate comprises a thickness in the range of 0.5 millimeters to 2 millimeters.

19. The system of claim 18 wherein the metal plate comprises a length in the range of 6 inches to 10 inches.

20. The system of claim 16 wherein the at least one aperture is spaced apart from the at least one fastener in the range of 3 inches to 7 inches.

* * * * *